March 18, 1958   W. P. ENGLISH   2,826,895
BEARING COOLING SYSTEM
Filed Sept. 3, 1953   2 Sheets-Sheet 1

INVENTOR:
William P. English
BY
ATTORNEYS

March 18, 1958 W. P. ENGLISH 2,826,895
BEARING COOLING SYSTEM

Filed Sept. 3, 1953 2 Sheets-Sheet 2

INVENTOR:
William P. English
BY
ATTORNEYS

United States Patent Office 2,826,895
Patented Mar. 18, 1958

2,826,895

BEARING COOLING SYSTEM

William P. English, Northport, N. Y., assignor to Fairchild Engine and Airplane Corporation, Farmingdale, N. Y., a corporation of Maryland Application September 3, 1953, Serial No. 378,245

9 Claims. (Cl. 60—35.6)

This invention relates to power plants or engines of the gas turbine type, and has particular reference to structures and arrangements for cooling bearings and other parts of the power plant.

In copending application Serial No. 376,590 filed August 26, 1953, by Mirza and Browne, now Patent No. 2,789,416, dated April 23, 1957, a system for air cooling the bearing or other part of a gas turbine engine is disclosed, in which the cooling air is derived from a source other than the compressor air, preferably ambient air, so that the initial temperature of the cooling air is comparatively low and the output of the compressor is not reduced by bleeding air therefrom for cooling purposes. The present invention is an improvement on the system of said copending application.

In accordance with the present invention, a system is provided for maintaining the turbine wheel bearing or other part at a temperature below its critical working temperature at all times and regulating the cooling air volume in a novel manner.

In a preferred embodiment of the invention, ambient air preferably augmented by the ram effect of the boundary air when the engine is in motion relatively thereto, is drawn in large volume by the aspirating effect of the turbine exhaust gases flowing past a venturi passage at the rear of the engine, and led through a duct system around the turbine bearing or other part requiring cooling to maintain its temperature below the critical working temperature. An adjustable cone within the exhaust nozzle, decreases or increases the nozzle area as the case may be, to thereby increase or decrease the jet thrust. This also has the desirable effect of increasing or decreasing the amount of air flowing through the duct system to cool the turbine bearing or other part.

It will be seen that the air cooling system of this invention is simple and effective to supply a large volume of cooling air from a point outside of the turbine engine proper without utilizing any of the compressor air therefrom, and in such a way that little or no power is lost to effect the desired cooling.

For a more complete understanding of the invention, reference may be had to the accompanying drawings, in which.

Figure 1:
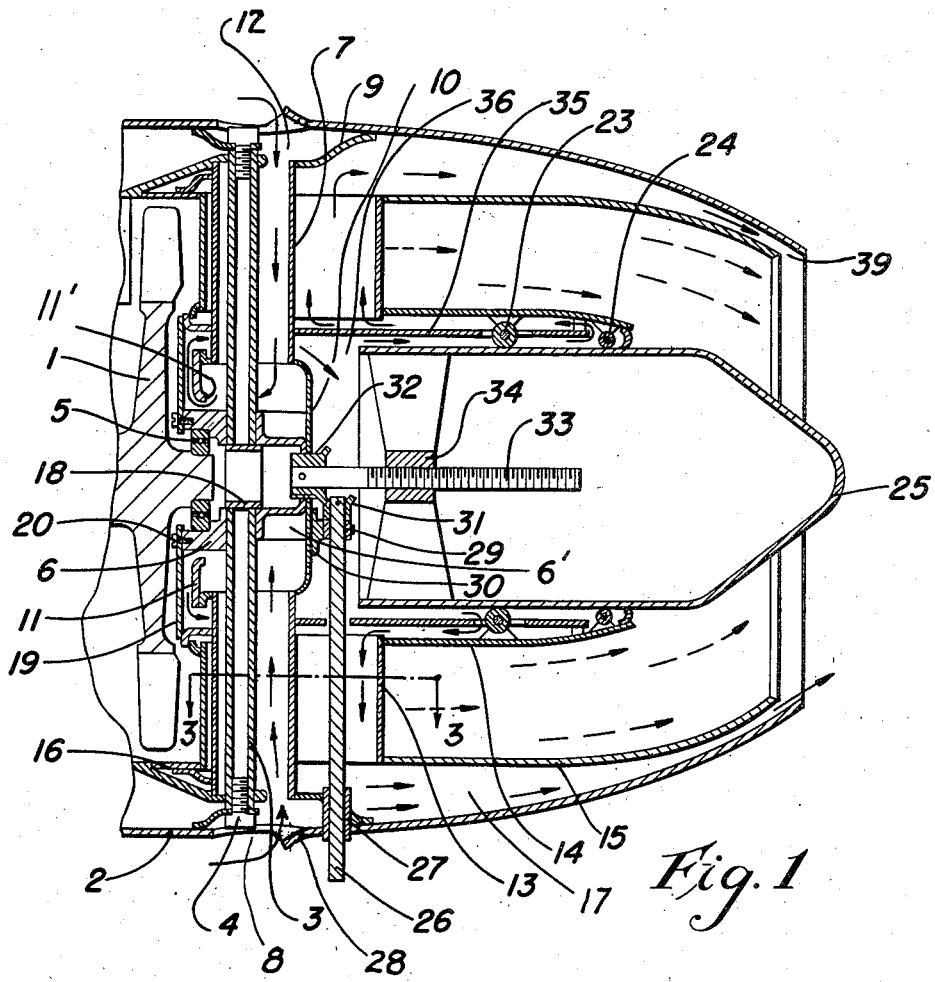
Figure 1 is an axial section through the rear end of a gas turbine engine and illustrating the bearing cooling system of this invention.

Referring particularly to Fig. 1, numeral 1 designates a turbine wheel supported at its rear end in housing 2 by means of struts 3, secured at their outer ends to housing 2 by screws 4 and seated at their inner ends in bearing housing 6 in which they are positioned by sleeve 18. Interposed between bearing housing 6 and turbine wheel 1 is turbine bearing 5 which may be a ball bearing as shown in Fig. 1.

Figure 3:
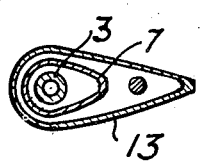
Fig. 3 is a cross-section as seen along the line 3—3 of Fig. 1.

Enclosing each supporting strut 3 is a tubular strut 7 supported by shroud 9 and in turn supporting central duct 10 having its forward wall 11 surrounding but spaced axially from bearing housing 6. The interior of strut 7, having the cross-sectional shape shown in Fig. 3, forms a duct connecting annular space 12, located outside of the engine proper, with duct 10. Space 12 communicates with the outside atmosphere through openings 8 in the housing and aligned with struts 7, thus providing the intake ducting of the cooling system to be further described.

Also enclosing each strut 7 is a strut 13 supporting tail cone 14 and in turn supported by exhaust nozzle 15, which receives its support from turbine casing 16. It will be observed from Fig. 3 that strut 13 encompasses strut 7 and is of streamline cross-section in the direction of flow of the exhaust gases, indicated by dotted arrows in Fig. 1 and that strut 13 connects outer annular space 17 with the interior of tail cone 14. Annular space 17 discharges through annular discharge slot 39 formed between the rear ends of the housing 2 and nozzle 15, as shown in Fig. 1.

Divider 19 separates the inner end of tail cone 14 from the turbine wheel 1 and substantially closes central duct 10 from communication with the turbine wheel 1. Divider 19 thus prevents flow of air from central duct 10 into the turbine as well as flow of gases from the turbine into the tail cone 14. Divider 19 is attached to bearing housing 6 by screws 20.

Concentrically mounted within fixed tail cone 14 on rollers 23 and 24 for axial movement therein is an adjustable extension or cone 25 having its outer end closed and tapered as shown in Fig. 1. The axial position of adjustable cone 25 is determined by torque shaft 26 journalled in bearings 27 and 29 and having a bevel pinion 31 which meshes with pinion 32 attached to screw 33 turning in sleeve 34 carried by adjustable cone 25. Bearing 27 is secured to engine housing 2 and bearing 29 is carried by bracket 30 secured to central duct 10. Rotation of shaft 26 moves adjustable cone 25 relatively to nozzle 15 and varies its annular orifice through which flow the exhaust gases from the turbine wheel 1, as is indicated by the dotted line arrows in Fig. 1.

The housing 2 of the engine is pierced with a series of openings 8 for entry of cooling air leading to the air spaces 12 at points opposite hollow struts 7 as shown in Fig. 1. The trailing edges of openings 8 are preferably raised to provide the air scoop 28 in order to take advantage of ram pressure due to forward velocity of the engine through the air. However it has been found that the ram effect is not necessary for operation of the device.

The annular space between fixed tail cone 14 and adjustable extension or cone 25 is divided by tubular divider 35 secured at its inner end to fixed tail cone 14. Tubular divider 35 is slotted to accommodate rollers 23, as shown in Fig. 1.

In operation of the system of Fig. 1, air entering space 12 between housing 2 and shroud 9 from atmosphere through openings 8 flows through intake ducts 7 into central duct 10 wherein it flows over housing 6 surrounding bearing 5, as indicated by the solid line arrows. Bearing housing 6, being cooled by the large flow of air, conducts heat away from bearing 5 and thus maintains bearing 5 below its critical working temperature. Housing 6 may have radial fins 6' on its outer wall to increase its effective radiation area.

Air leaving central duct 10 flows between bearing housing 6 and rearward extending flange 11' on wall 11 and thence between wall 11 and radial divider 19, whereby the latter is cooled and in turn the turbine wheel 1 is cooled by radiation therefrom to cooled divider 19.

The cooling air then flows into space 36 within tubular divider 35 which is under reduced pressure due to the evacuating effect on the high velocity exhaust gases ejected past the discharge slot 39 provided for that purpose at the exhaust end. Accordingly, a steady flow of cooling air is drawn through the bearing cooling system from openings 8, through ducts 7 and 10 over radial divider 19, into space 36, around axial divider 35, through duct 13, annular chamber or passage 17 and out through discharge slot or opening 39 wherein low pressure is created by the aspirating effect of the exhaust gases flowing through nozzle 15. This aspirating effect may be augmented by the ram effect of the boundary air entering air scoops 28 at openings 8 when the engine is in motion.

The volume of air flow induced in the manner described may be varied by controlling the aspirating effect through slot 39 by adjusting the velocity of flow of the exhaust gases through nozzle 15, and that is done by rotating shaft 26 to move adjustable extension or cone 25 inwardly or outwardly, as the case may be. Because of the tapering rear end of cone 25, rearward movement thereof decreases the discharge area of the nozzle 15 to increase the velocity of the exhaust gases flowing therethrough and thereby increases the aspirating effect thereof on slot 39. Inward movement of cone 25 has the opposite effect, i. e., of decreasing the exhaust gas velocity and consequently decreasing the aspirating effect on slot 39.

It will be observed that rollers 23 and 24, supporting adjustable cone 25, are cooled by air received from space 36 flowing rearward between cone 25 and divider 35, thence forward between cone 14 and divider 35 before leaving through opening 39.

Figure 2:
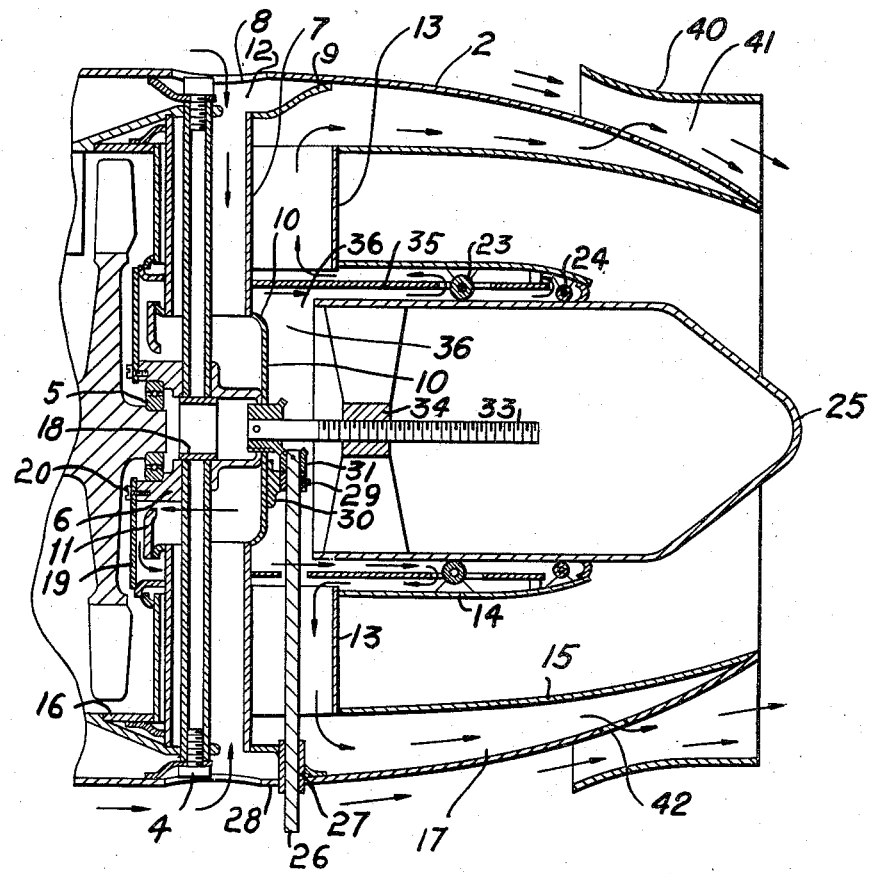
Fig. 2 is a modification thereof.

Referring now to Fig. 2, that shows a bearing cooling system similar to that of Fig. 1, the major difference being the method of obtaining pressure differential to cause flow of coolant through the air flow-inducing duct system. Numeral 40 indicates an annular shroud contoured to form a venturi passage 41 with the rear end of engine housing 2 having openings 42 leading from annular chamber 17 supplied with air through openings 8 as described. The ram air entering venturi passage 41 creates a suction drawing ambient cooling air through openings 8, intake ducts 7, central duct 10, space 36, duct 13, annular space 17, openings 42 and venturi passage 41. It will be understood, that if desired, openings 8 may be provided with the air scoops 28 of Fig. 1.

It will be observed that the basic principle, that of drawing coolant through the duct system by means of suction created at the coolant outlet due to a high velocity gas stream, is effectively utilized.

Thus, instead of bleeding off the compressor air for cooling purposes, the air or other fluid in relative motion to and surrounding the engine is utilized and caused to flow by the exhaust gas stream through an annular space, so that maximum pressure drop is obtained at the region of smallest section area, that of the slot 39 in Fig. 1, and openings 42 in Fig. 2. Expended cooling air is exhausted into this low pressure area rather than into the exhaust jet stream. This principle may be employed with equal facility for supplying cooling air to other parts of the engine.

Although a preferred embodiment of the invention has been illustrated and described herein, it is to be understood that the invention is not limited thereby, but is susceptible of changes in form and detail within the scope of the appended claims.

I claim:

1. In combination with a gas turbine engine for propelling a vehicle and having a heat-sensitive part and an enclosing housing affording a rear discharge opening, a nozzle for the turbine exhaust gases concentric with the housing opening and forming an annular air chamber therewith, said annular air chamber having an outlet positioned adjacent the end of said nozzle whereby the flow of the exhaust gases creates an aspirating effect on the air in said chamber, a tail cone within said nozzle, a casing surrounding said part and located within said tail cone, a duct connecting the interior of said tail cone to said annular chamber, and a second duct within said first duct and connecting the interior of said casing to atmosphere through an opening in the wall of said housing whereby the said aspirating effect induces flow of cooling air from said atmosphere opening through said second duct, said casing, the interior of said tail cone, said first duct, said annular space and out of said outlet.

2. In combination with a gas turbine engine for propelling a vehicle and having a heat-sensitive part and an enclosing housing affording a discharge opening, a nozzle for the turbine exhaust gases concentric with the housing opening and forming an annular air chamber therewith, said annular air chamber having an outlet positioned adjacent the end of said nozzle whereby the flow of the exhaust gases creates an aspirating effect on the air in said chamber, a tail cone within said nozzle, a casing surrounding said part and located within said tail cone, a duct connecting the interior of said tail cone to said annular chamber, a second duct within said first duct and connecting the interior of said casing to atmosphere through an opening in the wall of said housing whereby the said aspirating effect induces flow of cooling air from said atmosphere opening through said second duct, said casing, the interior of said tail cone, said first duct, said annular space and out of said outlet, and an air scoop on said housing connected to said outlet for augmenting the aspirating effect therethrough.

3. In combination with a gas turbine engine for propelling a vehicle and having a heat-sensitive part and an enclosing housing affording a discharge opening, a nozzle for the turbine exhaust gases concentric with the housing opening and forming an annular air chamber therewith, said annular air chamber having an outlet positioned adjacent the end of said nozzle whereby the flow of the exhaust gases creates an aspirating effect on the air in said chamber, a tail cone within said nozzle, a casing surrounding said part and located within said tail cone, a duct connecting the interior of said tail cone to said annular chamber, a second duct within said first duct and connecting the interior of said casing to atmosphere through an opening in the wall of said housing whereby the said aspirating effect induces flow of cooling air from said atmosphere opening through said second duct, said casing, the interior of said tail cone, said first duct, said annular space and out of said outlet, and an air scoop on said housing connected to said second duct.

4. In combination with a gas turbine engine for propelling a vehicle and having a heat-sensitive part and an enclosing housing affording a discharge opening, a nozzle for the turbine exhaust gases concentric with the housing opening and forming an annular air chamber therewith, said annular air chamber having an outlet positioned adjacent the end of said nozzle whereby the flow of the exhaust gases creates an aspirating effect on the air in said chamber, a tail cone within said nozzle, a casing surrounding said part and located within said tail cone, a duct connecting the interior of said tail cone to said annular chamber, a second duct within said first duct and connecting the interior of said casing to atmosphere through an opening in the wall of said housing whereby the said aspirating effect induces flow of cooling air from said atmosphere opening through said second duct, said casing, the interior of said tail cone, said first duct, said annular space and out of said outlet, and means for axially adjusting said tail cone to vary the velocity of the exhaust gases flowing through said nozzle.

5. In combination with a gas turbine engine for propelling a vehicle and having a heat-sensitive part and an enclosing housing affording a rear discharge opening, a nozzle for the turbine exhaust gases concentric with the housing opening and forming an annular air chamber therewith, said annular air chamber having an outlet positioned adjacent the end of said nozzle whereby the flow of the exhaust gases creates an aspirating effect on the air in said chamber, a tail cone within said nozzle, a casing surrounding said part and located within said tail cone, a duct connecting the interior of said tail cone to said annular chamber, a second duct within said first duct and connecting the interior of said casing to atmosphere through an opening in the wall of said housing whereby the said aspirating effect induces flow of cooling air from said atmosphere opening through said second duct, said casing, the interior of said tail cone, said first duct, said annular space and out of said outlet, and means for axially adjusting said tail cone to vary the velocity of the exhaust gases flowing through said nozzle, said means including a shaft extending through the wall of said housing and passing through said first duct to said tail cone.

6. In combination with a gas turbine engine for propelling a vehicle and having a heat-sensitive part and an enclosing housing affording a rear discharge opening, a nozzle for the turbine exhaust gases discharging through the housing opening and forming an annular air chamber therewith, said annular air chamber having an outlet positioned adjacent the discharge end of said nozzle whereby the flow of the exhaust gases creates an aspirating effect on the air in said chamber, a casing surrounding said part and connected to said annular chamber, a duct connecting the interior of said casing to atmosphere through an opening in said housing, a tail cone within said nozzle and forming an annular space therewith to which the exhaust gas flow is confined, an extension on said tail cone and spaced radially therefrom, and a tubular divider interposed in the space between said tail cone and said extension for dividing the air flowing between said cone and its extension from said housing opening to said annular chamber.

7. In combination with a gas turbine engine for propelling a vehicle and having a heat-sensitive part and an enclosing housing, a nozzle for the turbine exhaust gases, a hollow tail cone having a closed trailing end spaced within said nozzle, a casing surrounding said part and spaced within said tail cone, an air passage connecting the interior of said casing with the interior of said tail cone, a first duct connecting the interior of said casing to atmosphere, a second duct connecting the interior of said tail cone to the exterior of said nozzle, a passage from the outer end of said second duct ending adjacent the discharge end of said nozzle and so positioned that the flow of exhaust gases creates an aspirating effect whereby cooling air is induced to flow from atmosphere through said first duct, said casing, the interior of said tail cone, said second duct and out of said passage.

8. In combination with a gas turbine engine for propelling a vehicle and having a heat-sensitive part and an enclosing housing affording a discharge opening, a nozzle for the turbine exhaust gases discharging through the housing opening and forming an air chamber with said housing, said air chamber having an outlet positioned adjacent the discharge end of said nozzle whereby the flow of the exhaust gases creates an aspirating effect on the air in the said chamber, a hollow tail cone within the said nozzle and forming a substantially annular space therewith to which the exhaust gas flow is confined, a casing surrounding said part and communicating with the interior of said tail cone, said casing being located within the said nozzle, a duct connecting the interior of said air chamber to the interior of said tail cone, a duct connecting the interior of said casing to atmosphere through an opening in said housing, the aspirating effect inducing flow of cooling air through said casing, tail cone, air chamber and said ducts, and means for supporting and axially adjusting said tail cone to vary the velocity of the exhaust gases flowing through said nozzle, said supporting and adjusting means being positioned in the path of flow of said cooling air.

9. In combination with a gas turbine engine for propelling a vehicle and having a heat-sensitive part and an enclosing housing affording a discharge opening, a nozzle for the turbine exhaust gases discharging through the housing opening and forming an annular air chamber between said nozzle and said housing, said annular air chamber having an outlet positioned adjacent the discharge end of said nozzle whereby the flow of the exhaust gases creates an aspirating effect on the air in said chamber, a casing surrounding said heat-sensitive part, a first duct connecting the interior of said casing to atmosphere through an opening in said housing, a second duct connecting the interior of said casing to said air chamber for flow of air therethrough, a hollow tail cone having telescopically related sections within said nozzle and forming an annular space therewith to which the exhaust gas flow is confined, means on said housing for supporting one of the sections of said tail cone in subtantially fixed position, means for axially adjusting the other section relatively to said fixed section to vary the velocity of the exhaust gases flowing through said nozzle, said adjusting means being mounted partially in said hollow tail cone and partially in said second duct and cooled by flow of air through said duct.

References Cited in the file of this patent

UNITED STATES PATENTS

| | | |
|---|---|---|
| 2,470,126 | Altorfer | May 17, 1949 |
| 2,483,401 | Cole | Oct. 4, 1949 |
| 2,520,967 | Schmitt | Sept. 5, 1950 |
| 2,639,579 | Willgoos | May 26, 1953 |
| 2,744,722 | Orr | May 8, 1956 |